United States Patent [19]
Nishiyama et al.

[11] Patent Number: 5,307,689
[45] Date of Patent: May 3, 1994

[54] MASS FLOWMETER

[75] Inventors: Shigeru Nishiyama, Kanagawa; Hiroaki Hasegawa; Yasuji Miyata, both of Yokohama; Hiroshi Koido, Tokyo, all of Japan

[73] Assignee: Tokico Ltd., Kanagawa, Japan

[21] Appl. No.: 821,461

[22] Filed: Jan. 15, 1992

[30] Foreign Application Priority Data

Jan. 18, 1991 [JP] Japan .................. 3-004679

[51] Int. Cl.$^5$ ................................ G01F 1/86
[52] U.S. Cl. ................................ 73/861.38
[58] Field of Search ............. 73/861.37, 861.38

[56] References Cited

U.S. PATENT DOCUMENTS 4,187,721 2/1980 Smith .................. 73/861.38

FOREIGN PATENT DOCUMENTS

0107727 5/1991 Japan .................. 73/861.38

Primary Examiner—Herbert Goldstein
Attorney, Agent, or Firm—Michael N. Meller

[57] ABSTRACT

A mass flowmeter has a U-shaped sensor tube provided on a support base which is supported on a vibration absorbing member, and both ends of the sensor tube are respectively connected to an inlet and an outlet of a manifold. Vibrators are provided at an intermediate part of each straight tube part provided between the inlet and outlet sides of the sensor tube. Pickups are provided on the upstream and downstream sides of each vibrator so as to detect the displacement of the sensor tube. An external vibration is in an opposite direction between the inlet and outlet sides relative to the vibrating direction. Hence, outputs of the pickups located on the upstream sides of the vibrators are added, and outputs of the pickups located on the downstream sides of the vibrators are added. The external vibration is cancelled by obtaining a phase difference of the two added values.

12 Claims, 7 Drawing Sheets

MASS FLOWMETER

BACKGROUND OF THE INVENTION

The present invention generally relates to mass flowmeters, and more particularly to a mass flowmeter which can eliminate the effects of external vibration acting on a sensor tube.

As a kind of mass flowmeter for measuring a mass flow rate (flux) of a fluid, there is a flowmeter which measures the flux directly by using Coriolis' force which is generated when the fluid flows through a vibrating sensor tube. This kind of mass flowmeter is proposed in a Japanese Laid-Open Patent Application No.54-52570, for example. According to this proposed mass flowmeter, the fluid flows through an approximately U-shaped sensor tube, and the sensor tube is vibrated by a driving force of a vibrator (excitation coil). The Coriolis' force acts in the vibrating direction of the sensor tube, and in mutually opposite directions at the entrance and exit of the sensor tube, so that torsion is introduced in the sensor tube. The torsion angle is proportional to the flux. Hence, a pickup (vibration sensor) for picking up vibration is provided at the torsion positions at the entrance side and the exit side of the sensor tube. The flux is measured by measuring a time difference of output detection signals of the two pickups and measuring the torsion of the sensor tube.

The mass flowmeter described above is provided at an intermediate part of a pipe which normally supplies the fluid, and the inlet side and the outlet side of the mass flowmeter are respectively supported by the pipe. However, a pipe having a small diameter is used for a pipe path in which the flowing fluid has a relatively small flux, and a flexible tube made of a synthetic resin, for example, is used for a pipe path in which the fluid pressure is small. When the pipe path is formed by the pipe having the small diameter or the flexible tube, the mass flowmeter cannot be supported by the pipe or tube and the mass flowmeter must be mounted on the floor or a fixed base such as a bracket which is supported at a predetermined height by a beam.

But if the mass flowmeter is mounted on the fixed base, various external vibrations reach the mass flowmeter via the floor or the fixed base such as the bracket because various kinds of heavy machineries are provided in the factory, for example. Robots, pressing machines, cranes, fork lifts, compressors and machine tools are examples of the heavy machinery. On the other hand, since the proposed mass flowmeter described above is designed to measure the flux by vibrating the sensor tube, an accurate measurement cannot be made if the external vibration reaches the sensor tube or the pickups, and there is a problem in that the measuring accuracy deteriorates when the mass flowmeter is mounted on the floor or the fixed base.

As a measure against the external vibration, it is conceivable to support the mass flowmeter by a vibration absorbing rubber member. In this case, however, it is only possible to absorb the high-frequency vibration, and the low-frequency vibration cannot be absorbed by the vibration absorbing rubber member.

SUMMARY OF THE INVENTION

Accordingly, it is a general object of the present invention to provide a novel and useful mass flowmeter in which the problems described above are eliminated.

Another and more specific object of the present invention to provide a mass flowmeter for measuring a flux of a fluid comprising a sensor tube including a first tube part for receiving the fluid and a second tube part for outputting the fluid, vibrating means for vibrating the first tube part at a first position and the second tube part at a second position in mutually opposite directions, displacement detecting means for detecting a displacement of the first tube part on an upstream side and on a downstream side of the first position and a displacement of the second tube part on an upstream side and on a downstream side of the second position, and measuring means for calculating the flux of the fluid based on a phase difference between a first sum of the displacements detected on the upstream side of the first position and on the upstream side of the second position and a second sum of the displacements detected on the downstream side of the first position and on the downstream side of the second position. According to the mass flowmeter of the present invention, it is possible to cancel the external vibration which is transmitted to the sensor tube, and the flux can be calculated based on the phase difference at the inlet and outlet sides due to the Coriolis' force which is substantially dependent on the flux. Therefore, it is possible to satisfactorily eliminate the external vibration even if the low-frequency vibration is transmitted to the sensor tube, and an accurate flux measurement can be made without being affected by the external vibration. As a result, the mass flowmeter can be set up at locations where the surrounding machinery may become sources of the external vibration.

Still another object of the present invention is to provide a mass flowmeter for measuring a flux of a fluid comprising first and second sensor tubes respectively including a first tube part for receiving the fluid and a second tube part for outputting the fluid, first vibrating means for vibrating the first tube part of the first sensor tube at a first position and the second tube part of the first sensor tube at a second position in mutually opposite directions, second vibrating means for vibrating the first tube part of the second sensor tube at a first position and the second tube part of the second sensor tube at a second position in mutually opposite directions and with a 180° phase difference between a vibrating direction of the first sensor tube, displacement detecting means for detecting displacements of the first and second tube parts of the first sensor tube and displacements of the first and second tube parts of the second sensor tube, and measuring means for calculating the flux of the fluid based on a phase difference between a first sum of the displacements detected on the upstream side of the first position of the first sensor tube and on the upstream side of the first position of the second sensor tube and a second sum of the displacements detected on the downstream side of the second position of the first sensor tube and on the downstream side of the second position of the second sensor tube.

Other objects and further features of the present invention will be apparent from the following detailed description when read in conjunction with the accompanying drawings.

DESCRIPTION OF THE PREFERRED EMBODIMENTS

Figure 1:
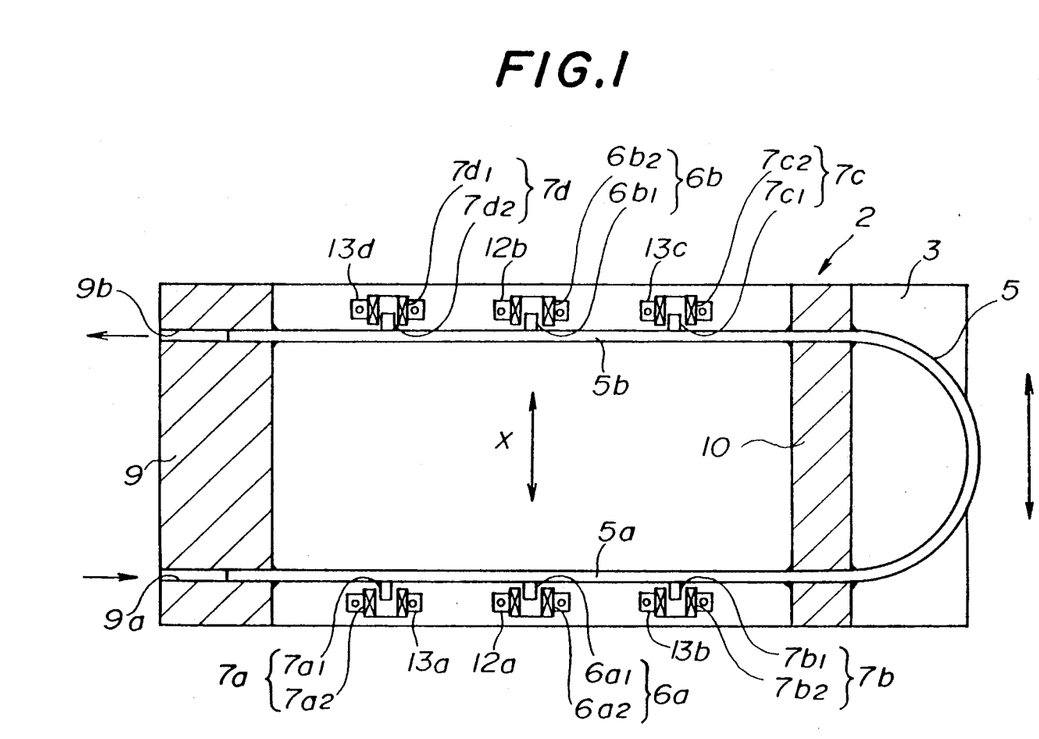
FIG. 1 is a plan view showing a first embodiment of a mass flowmeter according to the present invention.
Figure 2:
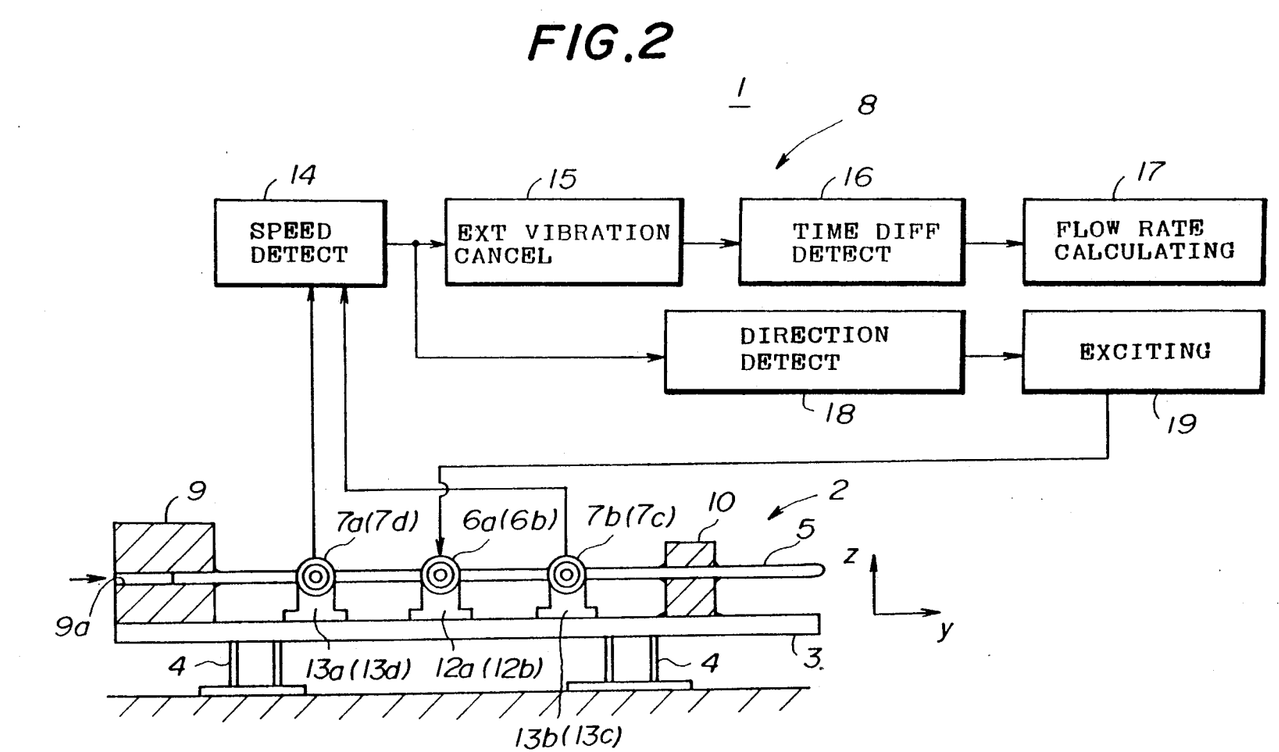
FIG. 2 is a diagram showing a side view of the first embodiment and a flux measuring circuit.

FIGS. 1 and 2 show a first embodiment of a mass flowmeter according to the present invention. In FIGS. 1 and 2, a mass flowmeter 1 generally includes a flux measuring part 2, a support base 3 which supports the flux measuring part 2, and a vibration absorbing member 4 which elastically supports the support base 3. The vibration absorbing member 4 is fixed on the floor surface, and absorbs high-frequency vibration which is generated from surrounding machinery and the like, for example. The flux measuring part 2 includes a U-shaped sensor tube 5, a pair of vibrators 6a and 6b, two pairs of pickups (first through fourth pickups) 7a through 7d respectively arranged on the upstream and downstream sides of the vibrators 6a and 6b, and a flux measuring circuit 8 which calculates a flux based on output signals of the pickups 7a through 7d.

The sensor tube 5 is made of stainless steel, for example. A base end part of the sensor tube 5 is held by a manifold 9 on the support base 3, and a tip end part of the sensor tube 5 is held by a support part 10 on the support base 3. In this embodiment, an inlet side straight tube part 5a of the sensor tube 5 is inserted into an inlet 9a of the manifold 9 and is fixed thereto by welding. On the other hand, an outlet side straight tube part 5b of the sensor tube 5 is inserted into an outlet 9b of the manifold 9 and is fixed thereto by welding. Tip end parts of the straight tube parts 5a and 5b penetrate the support part 10 and is fixed by welding.

The vibrator 6a is provided at a position to vibrate an approximate center position of the straight tube part 5a of the sensor tube 5, while the vibrator 6b is provided at a position to vibrate an approximate center position of the straight tube part 5b of the sensor tube 5. The construction of each of the vibrators 6a and 6b is substantially similar to that of a solenoid. The vibrator 6a is made up of a magnet 6a1 which is provided on the side of the straight tube part 5a of the sensor tube 5, and a coil 6a2 which drives the magnet 6a1 in a horizontal direction X. The vibrator 6b is made up of a magnet 6b1 which is provided on the side of the straight tube part 5b of the sensor tube 5, and a coil 6b2 which drives the magnet 6b1 in a horizontal direction X. The coils 6a2 and 6b2 are respectively held by brackets 12a and 12b which are fixed on the support base 3.

The first through fourth pickups 7a through 7d respectively have a construction similar to those of the vibrators 6a and 6b. The pickup 7a is made up of a magnet 7a1 which is provided on the side of the straight tube part 5a, and a coil 7a2 which generates a voltage depending on a relative speed of the magnet 7a1. The pickup 7b is made up of a magnet 7b1 which is provided on the side of the straight tube part 5a, and a coil 7b2 which generates a voltage depending on a relative speed of the magnet 7b1. The pickup 7c is made up of a magnet 7c1 which is provided on the side of the straight tube part 5b, and a coil 7c2 which generates a voltage depending on a relative speed of the magnet 7c1. The pickup 7d is made up of a magnet 7d1 which is provided on the side of the straight tube part 5b, and a coil 7d2 which generates a voltage depending on a relative speed of the magnet 7d1. The coils 7a2 through 7d2 are held by corresponding brackets 13a through 13d which are fixed on the support base 3.

The pickups 7a through 7d are not limited to the above described speed sensors. For example, known displacement sensors of the eddy current type, laser type or the like may be used as the pickups 7a through 7d to detect the relative displacement of the support base 3 and the straight tube parts 5a and 5b of the sensor tube 5. In this case, because the output detection signal of the displacement sensor generally includes a D.C. component, it is desirable to carry out the signal processing which will be described later using a displacement signal which has been eliminated of such a D.C. component by A.C. coupling.

The flux measuring circuit 8 includes a speed detection circuit 14 which calculates a speed from output detection signals of the pickups 7a through 7d when the detection signals are displacement signals, an external vibration cancel circuit 15 which eliminates external vibration components from the output detection signals of the pickups 7a through 7d as will be described later, a time difference detection circuit 16 which detects a time difference between an output on the inlet side and an output on the outlet side, and a flux calculation circuit 17 which calculates the flux by multiplying a coefficient to the time difference which is detected by the time difference detection circuit 16. The speed detection circuit 14 may be omitted if the output detection signals of the pickups 7a through 7d are speed signals. The flux measuring circuit 8 further includes a speed direction detection circuit 18 which detects a vibrating direction of the sensor tube 5 based on the output signal of the speed detection circuit 14, and an excitation circuit 19 which applies a forward direction current or a reverse direction current to the coils 6a2 and 6b2 of the vibrators 6a and 6b based on the output of the speed direction detection circuit 18.

Figure 3:
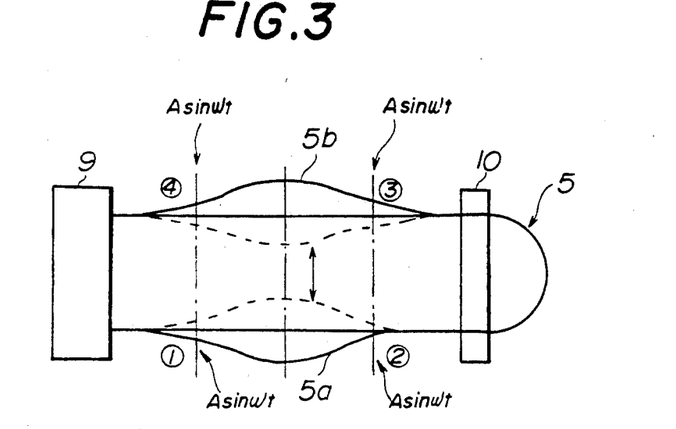
FIG. 3 is a plan view showing a vibration state of a sensor tube.
Figure 4:
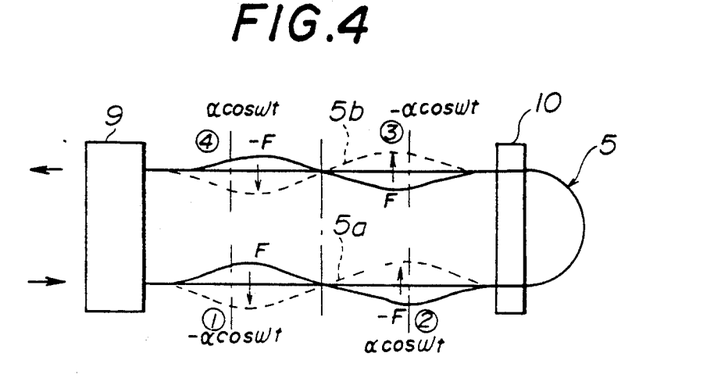
FIG. 4 is a plan view showing a vibration state when a Coriolis' force acts on the sensor tube.

When measuring the flux by this mass flowmeter 1, the straight tube parts 5a and 5b of the sensor tube 5 are vibrated in the direction X so as to close upon or separate from each other with a function Asinωt as shown in FIG. 3. When the fluid flows through the sensor tube 5 which vibrates such that the straight tube parts 5a and 5b close upon each other, a Coriolis' force F ($=-\alpha\cos\omega t$) acts in a direction opposite to the vibrating direction on the upstream side of each of the vibrators 6a and 6b as shown in FIG. 4, and a Coriolis' force F ($=\alpha\cos\omega t$) acts in the vibrating direction on the downstream side of each of the vibrators 6a and 6b, where the "vibrating direction" refers to the direction in which the vibrators 6a and 6b vibrate the sensor tube 5. As a result, the straight tube parts 5a and 5b of the sensor tube 5 are displaced as shown in FIG. 4. $\omega$ denotes a resonance frequency, A denotes a maximum amplitude of the vibration which is generated by the vibrator 6a (6b) and is picked up at the position of the pickup 7a (7d), and $\alpha$ denotes a maximum amplitude of a vibration introduced by the Coriolis' force.

Figure 5:
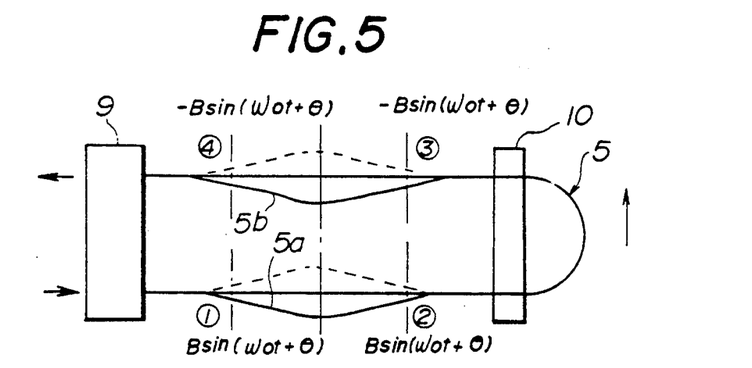
FIG. 5 is a plan view showing a vibration state when an external vibration acts on the sensor tube.

However, when the low-frequency vibration in the horizontal direction is transmitted to the mass flowmeter 1 from the peripheral machinery or the like via the floor surface, the sensor tube 5 undergoes a deformation $\pm B\sin(\omega_0 t + \theta)$ as shown in FIG. 5. For this reason, the coils 7a2 through 7d2 of the pickups 7a through 7d detect the Coriolis' force and the low-frequency vibration (external vibration). $\omega_0$ denotes an external vibration frequency, B denotes a maximum amplitude of the vibration which is generated by the vibrator 6a (6b) and is picked up at the position of the pickup 7b (7c), and $\theta$ denotes a phase difference angle between the external vibration and the vibration generated by the vibrator 6a (6b).

In other words, outputs of the pickups 7a through 7d can be described in the form of signals which are based on changes of D1 through D4 which are defined as follows.

Output of the first pickup 7a:
$D1 = A\sin\omega t - \alpha\cos\omega t + B\sin(\omega_0 t + \theta)$
Output of the second pickup 7b:
$D2 = A\sin\omega t + \alpha\cos\omega t + B\sin(\omega_0 t + \theta)$
Output of the third pickup 7c:
$D3 = A\sin\omega t - \alpha\cos\omega t - B\sin(\omega_0 t + \theta)$
Output of the fourth pickup 7d:
$D4 = A\sin\omega t + \alpha\cos\omega t - B\sin(\omega_0 t + \theta)$ In this embodiment, a kind of a speed sensor is used as the pickups 7a through 7d, and the pickups 7a through 7d thus output signals which are based on the changes of the outputs D1 through D4. However, if a kind of a displacement sensor for detecting a displacement of the sensor tube 5 is used for the pickups 7a through 7d, the changes of the outputs D1 through D4 are obtained directly from the pickups 7a through 7d. Accordingly, if the pickups 7a through 7d are speed sensors, the speed detection circuit 14 simply amplifies the signal if needed, and the speed detection circuit 14 may be omitted and the output signal lines of the pickups 7a through 7d are appropriately connected to the external vibration cancel circuit 15 if no signal amplification is required. On the other hand, if the pickups 7a through 7d are displacement sensors, it is necessary to convert the outputs D1 through D4 of the pickups 7a through 7d into a speed signal in the speed detection circuit 14.

The outputs of the pickups 7a through 7d are supplied to the external vibration cancel circuit 15 via the speed detection circuit 14, and only the external vibration component is eliminated in the external vibration cancel circuit 15. In other words, the external vibration cancel circuit 15 adds the outputs of the first and third pickups 7a and 7c, and adds the outputs of the second and fourth pickups 7b and 7d. This is because the Coriolis' force both act in the negative direction on the upstream side of the vibrator 6a and on the upstream side of the vibrator 6b, and the external vibration acts in opposite directions at the inlet side and the outlet side with relative to the vibrating direction. Similarly, the Coriolis' force both act in the positive direction on the downstream side of the vibrator 6a and on the downstream side of the vibrator 6b, and the external vibration acts in opposite directions at the inlet side and the outlet side with relative to the vibrating direction. Accordingly, the output on the upstream side, in which the external vibration is cancelled, is obtained by adding the outputs of the first and third pickups 7a and 7c which are located on the upstream side of the respective vibrators 6a and 6b. On the other hand, the output on the downstream side, in which the external vibration is cancelled, is obtained by adding the outputs of the second and fourth pickups 7b and 7d which are located on the downstream side of the respective vibrators 6a and 6b. The output on the upstream side which is obtained by adding the outputs on the upstream sides of the vibrators 6a and 6b can be described by $2A\sin\omega t - 2\alpha\cos\omega t$, while the output on the downstream side which is obtained by adding the outputs on the downstream sides of the vibrators 6a and 6b can be described by $2A\sin\omega t + 2\alpha\cos\omega t$.

The time difference detection circuit 16 detects a phase difference between the two signals output from the external vibration cancel circuit 15, and supplies to the flux calculation circuit 17 a signal which is proportional to the flux and is eliminated of the external vibration components. Hence, the flux calculation circuit 17 can output an accurate flux measurement signal which is unaffected by the external vibration.

In this embodiment, the external vibration can be cancelled satisfactorily although the mass flowmeter 1 uses a single sensor tube 5 and has a simple construction. In addition, the output signal in which the external vibration components can be described in the form of an output waveform having twice the amplitude, it is possible to more accurately detect the phase difference between the inlet side and the outlet side.

The sensor tube 5 is only provided with the magnets 6a1 and 6b1 of the vibrators 6a and 6b and the magnets 7a1 through 7d1 of the pickups 7a through 7d, and the relatively heavy coils 6a2, 6b2 and 7a2 through 7d2 are supported on the support base 3. For this reason, the sensor tube 5 does not need to be extremely strong, and the diameter and thickness of the sensor tube 5 can be reduced. Furthermore, the vibrators 6a and 6b need not be two independent vibrators, and a single vibrator may be provided across the straight tube parts 5a and 5b of the sensor tube 5 so as to function both as the vibrator 6a and the vibrator 6b.

The positions of the vibrators 6a and 6b are not limited to the approximate center position of the respective straight tube parts 5a and 5b. Moreover, the distances between the vibrator 6a and the two pickups 7a and 7b and the distances between the vibrator 6b and the two pickups 7c and 7d need not necessarily be the same. However, in order to simplify the calculation process within the flux calculation circuit 8 and to suppress the effects of noise introduced by signal amplification, it is desirable to arrange the pickups 7a and 7b at positions where approximately the same vibration amplitude is detectable with respect to a given vibration, and to arrange the pickups 7c and 7d at positions where approximately the same vibration amplitude is detectable with respect to a given vibration. The arrangement of the vibrators 6a and 6b and the pickups 7a through 7d may be set similarly for the embodiments which will be described in the following.

In the flux measuring circuit 8 shown in FIG. 2, the circuits 14 through 19 themselves can be realized by known circuits, and illustration and description related to the internal circuit construction will be omitted in this specification. In addition, the operation of a part (for example, the external vibration cancel circuit 15) or all of the flux measuring circuit 8 may be realized by software instead of hardware. In this case, a processing system including a known central processing unit (CPU) and a memory for storing the necessary programs and data is used to carry out the software processing.

Figure 6:
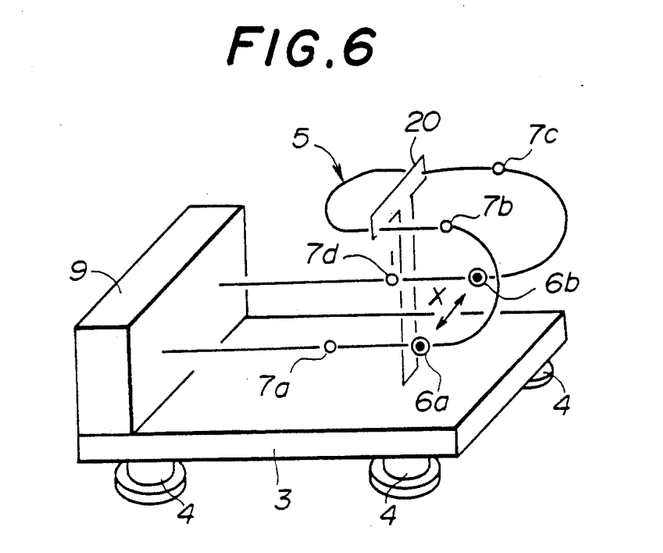
FIG. 6 is a perspective view showing a second embodiment of the mass flowmeter according to the present invention.

Next, a description will be given of a second embodiment of the mass flowmeter according to the present invention, by referring to FIG. 6. In FIG. 6, those parts which are the same as those corresponding parts in FIGS. 1 and 2 are designated by the same reference numerals, and a description thereof will be omitted.

The shape of the sensor tube 5 is not limited to the U-shape, and in this embodiment, the straight tube parts 5a and 5b are further bent in a U-shape as shown in FIG. 6 so that the sensor tube 5 has a J-shape in a front view. The tip end part of the sensor tube 5 is held by a T-shaped holding member 20 which is provided on the support base 3. The output detection signals of the pickups 7a through 7d are supplied to the external vibration cancel circuit 15 wherein the external vibration components are cancelled similarly as in the case of the first embodiment. The flux calculation circuit 17 converts the outputs of the external vibration cancel circuit 15 which is received via the time difference detection circuit 16 into the accurate flux measurement signal.

According to this embodiment, the length of the mass flowmeter in the horizontal direction in FIG. 6 can be reduced compared to that of the first embodiment.

Figure 7:
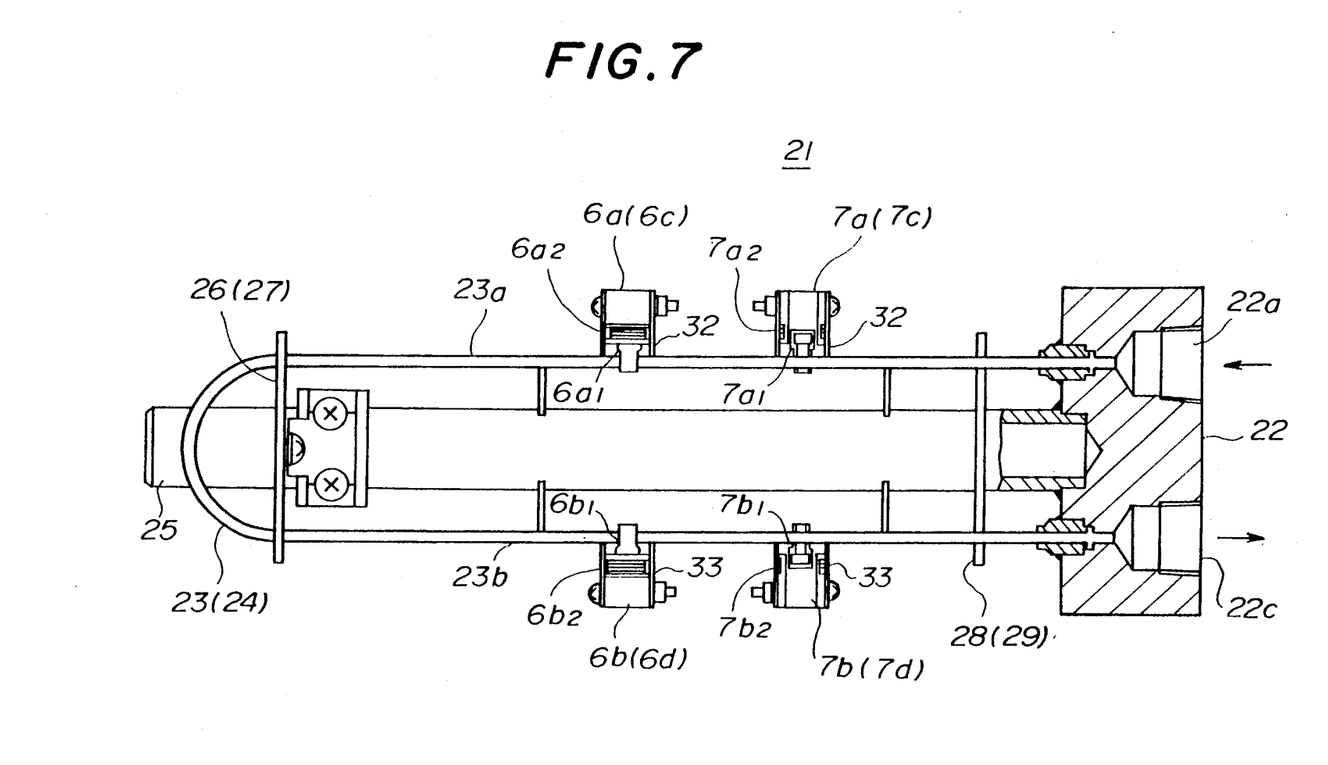
FIG. 7 is a plan view showing a third embodiment of the mass flowmeter according to the present invention.
Figure 8:
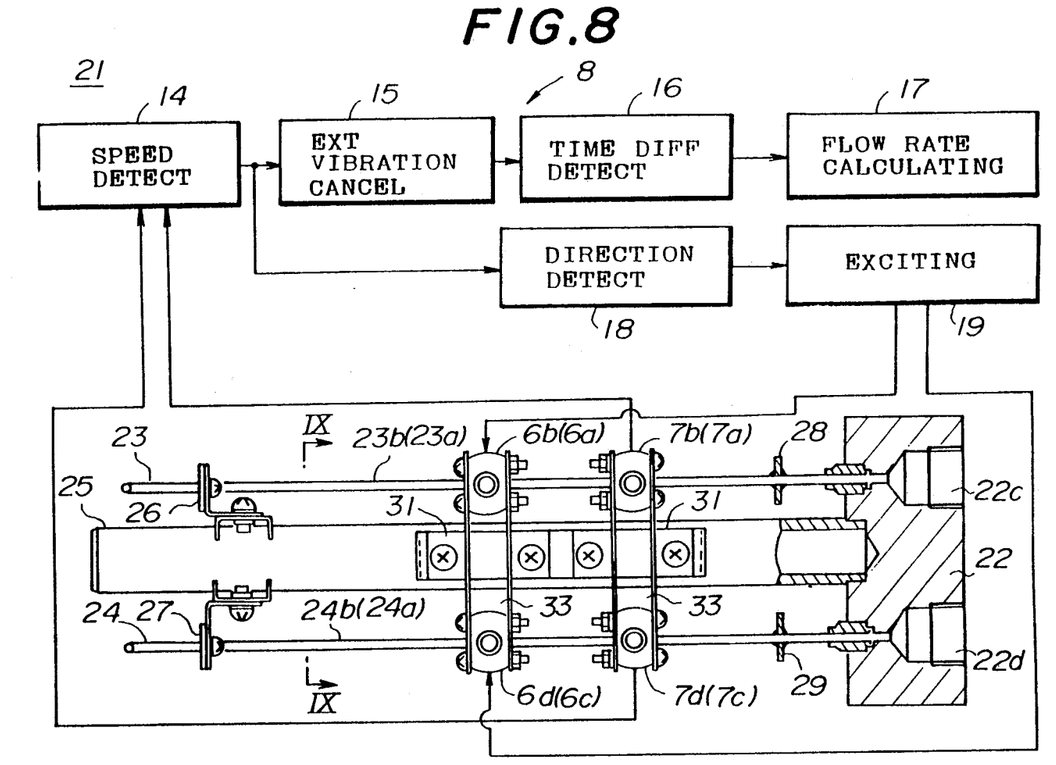
FIG. 8 is a diagram showing a side view of the third embodiment and a flux measuring circuit.
Figure 9:
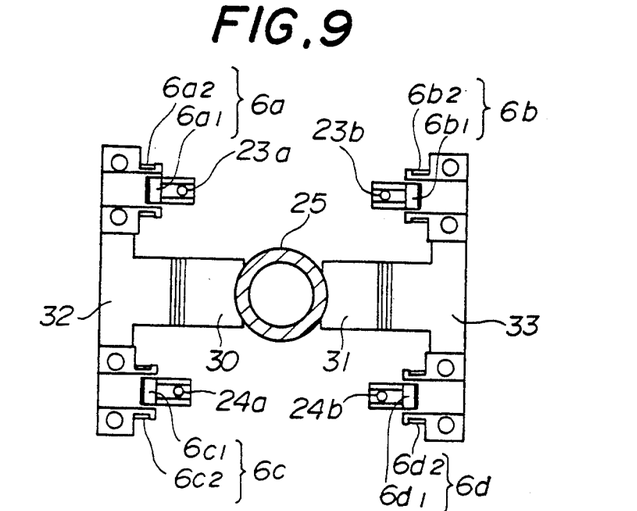
FIG. 9 is a cross sectional view showing the third embodiment along a line IX—IX in FIG. 8.

Next, a description will be given of a third embodiment of the mass flowmeter according to the present invention, by referring to FIGS. 7 through 9. In FIGS. 7 through 9, those parts which are the same as those corresponding parts in FIGS. 1 and 2 are designated by the same reference numerals, and a description thereof will be omitted.

In FIGS. 7 through 9, a mass flowmeter 21 includes a pair of sensor tubes 23 and 24 which extend in a horizontal direction from a manifold 22. The manifold 22 is fixed on the support base 3 which is supported by a vibration absorbing member such as the vibration absorbing member 4 shown in FIG. 2. A cylindrical support 25 which extends at an intermediate position between the sensor tubes 23 and 24 is fixed to the manifold 22 by welding. The pair of sensor tubes 23 and 24 forms a U-shape when viewed from the top. The sensor tube 23 is provided above the cylindrical support 25, while the sensor tube 24 is provided below the cylindrical support 25. Straight tube parts 23a and 24a on the inlet sides of the sensor tubes 23 and 24 are respectively connected to inlets 22a and 22b of the manifold 22. On the other hand, straight tube parts 23b and 24b on the outlet sides of the sensor tubes 23 and 24 are respectively connected to outlets 22c and 22d of the manifold 22. The tip end parts of the sensor tubes 23 and 24 are respectively held by support plates 26 and 27 which are fixed to the cylindrical support 25, and the base end sides of the sensor tubes 23 and 24 are respectively held by support plates 28 and 29.

First through fourth vibrators 6a, 6b, 6c and 6d are respectively provided at intermediate positions of the straight tube parts 23a, 23b, 24a and 24b of the sensor tubes 23 and 24. As shown in FIG. 9, the vibrators 6a through 6d respectively include magnets 6a1 through 6d1 which are provided on the corresponding straight tube parts 23a, 23b, 24a and 24b so as to project to the side, and coils 6a2 through 6d2 which are held by brackets 32 and 33 which are fixed on support parts 30 and 31 which extend on both sides of the cylindrical support 25. Accordingly, the sensor tubes 23 and 24 are vibrated in the horizontal direction C by the electromagnetic forces exerted by the coils 6a2 through 6d2, but the sensor tubes 23 and 24 vibrate with a phase difference of 180°. In other words, the vibrators 6a through 6d vibrate the sensor tubes 23 and 24 so that the straight tube parts 24a and 24b of the lower sensor tube 24 separate from each other when the straight tube parts 23a and 23b of the upper sensor tube 23 close upon each other. The first through fourth pickups 7a through 7d which detect the displacements of the sensor tubes 23 and 24 have a construction similar to that of the vibrators 6a through 6d. As shown in FIG. 9, the pickups 7a through 7d are held by the brackets 30 and 31.

Figure 10:
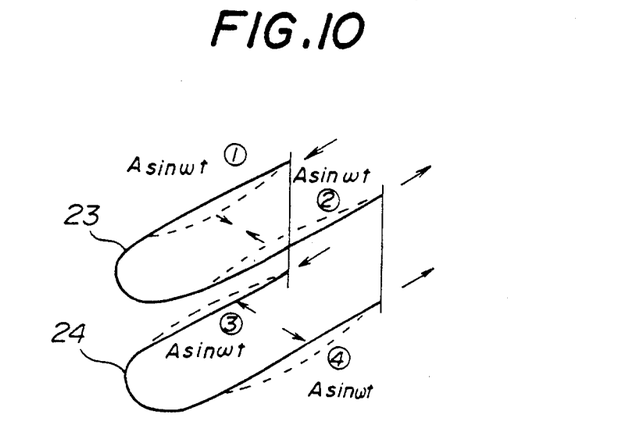
FIG. 10 is a perspective view showing a vibration state of a sensor tube.
Figure 11:
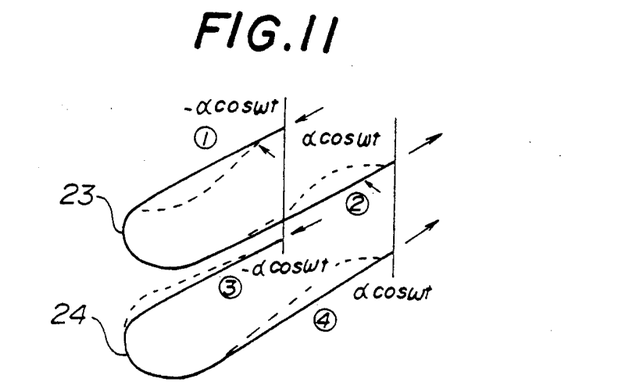
FIG. 11 is a perspective view showing a vibration state when a Coriolis' force acts on the sensor tube.

Next, a description will be given of the operation of the mass flowmeter 21. When measuring the flux, the vibrators 6a through 6d vibrate the sensor tubes 23 and 24 so that the straight tube parts 23a and 23b of the upper sensor tube 23 and the straight tube parts 24a and 24b of the lower sensor tube 24 vibrate at the resonance frequency but with a phase difference of 180°, as shown in FIG. 10. When the fluid flows through the sensor tubes 23 and 24 which vibrate in this manner and the straight tube parts 23a and 23b are displaced to close upon each other while the straight tube parts 24a and 24b are displaced to separate from each other, a Coriolis' force acts in a direction opposite to the vibrating direction on the upstream sides of the first and third vibrators 6a and 6c which are provided on the inlet side as shown in FIG. 11, and a Coriolis' force acts in the vibrating direction on the downstream sides of the second and fourth vibrators 6b and 6d which are provided on the outlet side as shown in FIG. 11.

Figure 12:
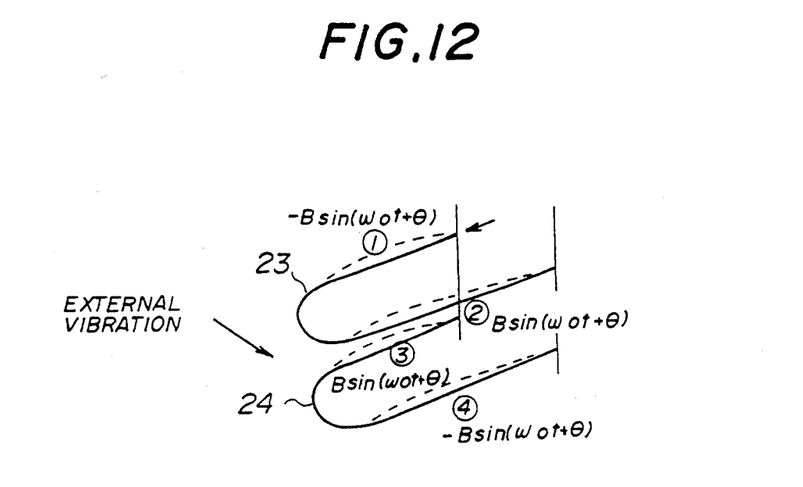
FIG. 12 is a perspective view showing a vibration state when an external vibration acts on the sensor tube.

But as shown in FIG. 12, the pickups 7a through 7d detect the Coriolis' force and the low-frequency vibration (external vibration) when the low-frequency vibration in the horizontal direction is transmitted to the sensor tubes 23 and 24.

In other words, the outputs of the pickups 7a through 7d are signals based on the following outputs D1 through D4, where A, B, $\alpha$, $\theta$, $\omega$ and $\omega_0$ have the same meaning as in the first embodiment.

Output of the first pickup 7a:
$D1 = A\sin\omega t - \alpha\cos\omega t - B\sin(\omega_0 t + \theta)$
Output of the second pickup 7b:
$D2 = A\sin\omega t + \alpha\cos\omega t + B\sin(\omega_0 t + \theta)$
Output of the third pickup 7c:
$D3 = A\sin\omega t - \alpha\cos\omega t + B\sin(\omega_0 t + \theta)$
Output of the fourth pickup 7d:
$D4 = A\sin\omega t + \alpha\cos\omega t - B\sin(\omega_0 t + \theta)$ The outputs of the pickups 7a through 7d are supplied to the external vibration cancel circuit 15 via the speed detection circuit 14, and the external vibration cancel circuit 15 adds the outputs of the first and third pickups 7a and 7c on the inlet side and adds the outputs of the second and fourth pickups 7b and 7d on the outlet side. This is because the Coriolis' forces act in the same direction on the upstream sides of the upper and lower vibrators 6a and 6b, but the external vibrations act in the opposite directions. Similarly, the Coriolis' forces act in the same direction on the downstream sides of the upper and lower vibrators 6b and 6d, but the external vibrations act in the opposite directions.

Accordingly, the output on the inlet side, cancelled of the external vibration component, is obtained by adding the outputs of the first and third pickups 7a and 7c. In addition, the output on the outlet side, cancelled of the external vibration component, is obtained by adding the outputs of the second and fourth pickups 7b and 7d. The signals output from the external vibration cancel circuit 15 are thus $2A\sin\omega t - 2\alpha\cos\omega t$ which is the output on the inlet side and $2A\sin\omega t + 2\alpha\cos\omega t$ which is the output on the outlet side. The signals in which the external vibration component is eliminated is supplied to the time difference detection circuit 16 which detects the phase difference between the inlet side signal and the outlet side signal. The flux calculation circuit 17 calculates the flux based on the phase difference which is detected by the time difference detection circuit 16.

In each of the embodiments described above, the output signals of the pickups 7a through 7d are supplied to the external vibration cancel circuit 15 and the signal processing is carried out so as to cancel the external vibration component. However, it is also possible to obtain the flux by other methods. For example, the pickups 7a and 7c are connected in series and the pickups 7b and 7d are connected in series to add the output signals of the appropriate ones of the pickups 7a through 7d by connection of the output lines, and the flux can be obtained by detecting the time difference by supplying the output signals of the pickups 7a and 7c and the output signals of the pickups 7b and 7d to the time difference detection circuit 16. In this case, the external vibration cancel circuit 15 can be omitted.

Only the magnets 6a1 through 6d1 of the vibrators 6a through 6d and the magnets 7a1 through 7d1 of the pickups 7a through 7d are provided on the sensor tubes 23 and 24. The coils 6a2 through 6d2 and the coils 7a2 through 7d2 which are relatively heavy are supported on the cylindrical support 25. Therefore, the sensor tubes 23 and 24 need not be extremely strong, and the diameter and thickness of the sensor tubes 23 and 24 may be relatively small.

Therefore, according to the mass flowmeter of the present invention, the output signals of the four pickups which detect the displacements of the sensor tube are appropriately added, so as to cancel the external vibration which is transmitted to the sensor tube. The flux can be calculated based on the phase difference between the inlet side and the outlet side due to the Coriolis' forces which are substantially dependent on the flux. Hence, even if the low-frequency vibration is transmitted to the sensor tube, this external vibration can be eliminated satisfactorily. As a result, it is possible to accurately measure the flux without being affected by the external vibration, and the mass flowmeter can be set up at a location where the surrounding machinery may become sources of the external vibration.

Further, the present invention is not limited to these embodiments, but various variations and modifications may be made without departing from the scope of the present invention.

What is claimed is

1. A mass flowmeter for measuring a flux of a fluid comprising:
    a sensor tube including a first tube part for receiving the fluid and a second tube part for outputting the fluid;
    vibrating means for vibrating the first tube part at a first position and the second tube part at a second position in mutually opposite directions;
    displacement detecting means for detecting a displacement of the first tube part on an upstream side and on a downstream side of the first position and a displacement of the second tube part on an upstream side and on a downstream side of the second position; and
    measuring means for calculating the flux of the fluid based on a phase difference between a first sum of the displacements detected on the upstream side of the first position and on the upstream side of the second position and a second sum of the displacements detected on the downstream side of the first position and on the downstream side of the second position.

2. The mass flowmeter as claimed in claim 1, wherein said sensor tube has an approximate U-shape.

3. The mass flowmeter as claimed in claim 2, wherein the first and second tube parts include parts which extend approximately parallel to each other.

4. The mass flowmeter as claimed in claim 3, wherein the parts of the first and second tube parts which extend approximately parallel to each other are straight.

5. The mass flowmeter as claimed in claim 1, wherein the first and second tube parts include parts which extend approximately parallel to each other.

6. The mass flowmeter as claimed in claim 1, wherein the first position is provided at an approximate center position of the first tube part, and the second position is provided at an approximate center position of the second tube part.

7. The mass flowmeter as claimed in claim 1, wherein said displacement detecting means includes first and second detectors for respectively detecting the displacements of the first tube part on the upstream side and on the downstream side of the first position, and third and fourth detectors for respectively detecting the displacements of the second tube part on the upstream side and on the downstream side of the second position.

8. The mass flowmeter as claimed in claim 6, wherein said first and second detectors are respectively arranged at positions on the upstream side and on the downstream side of the first position for detecting approximately the same vibration amplitude for a given vibration, and said third and fourth detectors are respectively arranged at positions on the upstream side and on the downstream side of the second position for detecting approximately the same vibration amplitude for a given vibration.

9. The mass flowmeter as claimed in claim 7, wherein said measuring means includes first means for obtaining a sum of outputs of said first and third detectors and a sum of outputs of the second and fourth detectors, and second means for calculating the flux of the fluid based on a phase difference between the two sums obtained by said first means.

10. The mass flowmeter as claimed in claim 7, wherein the outputs of said first through fourth detectors are dependent on D1 through D4, $D1 = A\sin\omega t - \alpha\cos\omega t + B\sin(\omega_0 t + \theta)$
$D2 = A\sin\omega t + \alpha\cos\omega t + B\sin(\omega_0 t + \theta)$
$D3 = A\sin\omega t - \alpha\cos\omega t - B\sin(\omega_0 t + \theta)$
$D4 = A\sin\omega t + \alpha\cos\omega t - B\sin(\omega_0 t + \theta)$ where $\omega$ denotes a resonance frequency, $\omega_0$ denotes an external vibration frequency, A denotes a maximum amplitude of the vibration which is generated by said vibrating means and is picked up at the positions of said first and fourth detectors, B denotes a maximum amplitude of the vibration which is generated by said vibrating means and is picked up at the positions of said second and third detectors, $\alpha$ denotes a maximum amplitude of a vibration introduced by Coriolis' force, and $\theta$ denotes a phase difference angle between an external vibration and the vibration generated by said vibrating means.

11. The mass flowmeter as claimed in claim 1, wherein said vibrating means includes a first vibrator provided at the first position and a second vibrator provided at the second position.

12. The mass flowmeter as claimed in claim 1, wherein said displacement detecting means includes speed sensors for detecting displacements at the upstream and downstream sides of the first position of the first tube part and displacements at the upstream and downstream sides of the second position of the second tube part as relative speeds with respect to a reference position.

* * * * *